Dec. 7, 1937.   A. WHITEMAN   2,101,161
SLIDE STAINING AND HEATING RACK
Filed March 19, 1937
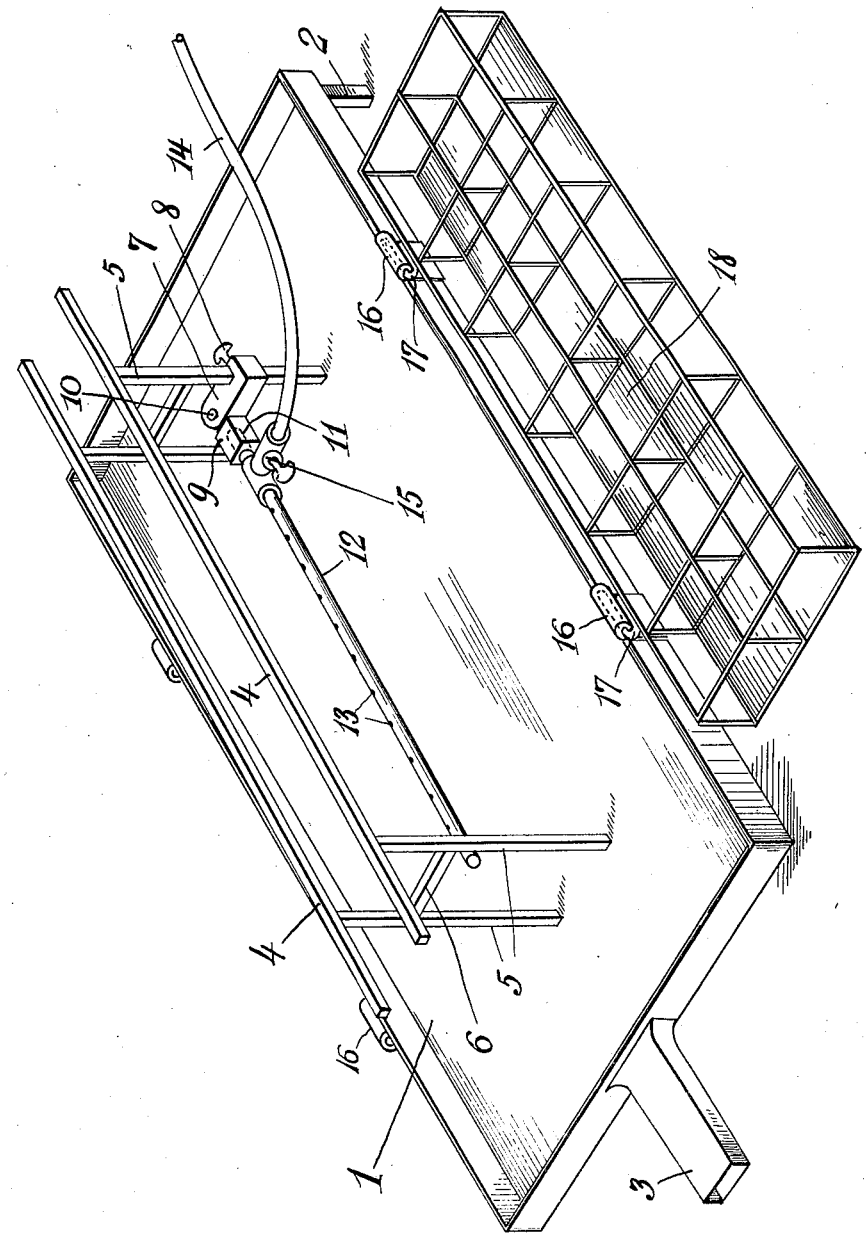
INVENTOR.
Arthur Whiteman
BY
Ivan E. A. Konigsberg
ATTORNEYS.

Patented Dec. 7, 1937

2,101,161

UNITED STATES PATENT OFFICE 2,101,161

SLIDE STAINING AND HEATING RACK

Arthur Whiteman, New York, N. Y.

Application March 19, 1937, Serial No. 131,889

3 Claims. (Cl. 34—21)

The object of my invention is to provide a generally improved staining rack and microscopic slide drier. More particularly the object of my invention is to provide an improved device adapted for use in heating and staining microscopic slides after specimens have been placed thereon. It is also an object of my invention to arrange and construct the device in a manner to provide for convenient washing of the slides.

With the foregoing and other objects in view my invention is embodied in a slide staining and heating rack arranged and constructed as hereinafter set forth and as illustrated in the accompanying drawing which shows a perspective view of the device.

Referring to the drawing the reference numeral 1 denotes a tray which is supported on an incline, the same having relatively long feet 2 at one end. At the other end the tray has a drain outlet 3. Within the tray there is supported a rack for supporting the slides. The rack consists of two parallel horizontal bars 4, 4 supported on uprights 5, 5 braced as at 6. One of the uprights supports a bracket 7 which may be adjusted vertically by a thumb screw 8. A socket member 9 is pivoted to the bracket at 10 and is adapted to receive and hold by friction the closed end 11 of a burner pipe 12 having gas burner openings 13. Gas is supplied to the pipe from a supply, not shown, through a flexible connection 14 controlled by a valve 15.

In operation it will be understood that microscopic slides, not shown, may be placed on the bars 4 and heated by the heat from the pipe 12. The pipe may be raised or lowered by adjusting the bracket 7 and it may be moved from side to side on the pivot 10.

The tray is provided with socket members 16 on one or both sides for the purpose of receiving hooks 17 attached to a basket 18 arranged to contain and hold the bottles which contain the stains or other fluid to be used. The basket is thus easily attached to or removed from the tray by a simple sliding movement.

The entire device is simple in construction and affords support for the slides, the heating apparatus and the bottle basket. The slides may be washed by simply removing the burner pipe from the socket member 9. As the water falls upon the tray it drains away through the outlet.

Although I have disclosed my invention in its preferred form, nevertheless it will be understood that the same is susceptible of changes and modifications within the scope of the appended claims.

I claim:—

1. A slide staining and heating rack comprising a tray, a rack in said tray for supporting slides, a bracket adjustably secured to said rack, a gas heater pipe movably and frictionally carried by said bracket, means for supplying gas to said pipe and a valve for controlling the gas supply.

2. A slide staining and heating rack comprising an inclined tray having a drain outlet at its lower end, a rack in said tray including horizontal bars for supporting slides, means for heating slides on said bars comprising a gas burner pipe beneath the same, means for supplying gas to said pipe and means for securing the pipe to the said rack in vertically and laterally movable relation, said securing means comprising a bracket carried by the rack in vertically adjustable relation, a socket member pivoted on the bracket and adapted to receive the said burner pipe.

3. A slide staining and heating rack comprising a tray, a slide supporting rack within the same, detachable slide heating means carried by the rack in vertically and laterally adjustable relation and socket members secured to one side of the tray for supporting a staining bottle basket upon the tray in detachable relation thereto.

ARTHUR WHITEMAN.